June 14, 1927.
R. A. NORLING
1,632,671
REVERSING MECHANISM FOR ELECTRIC DRILLS
Filed Sept. 2, 1922
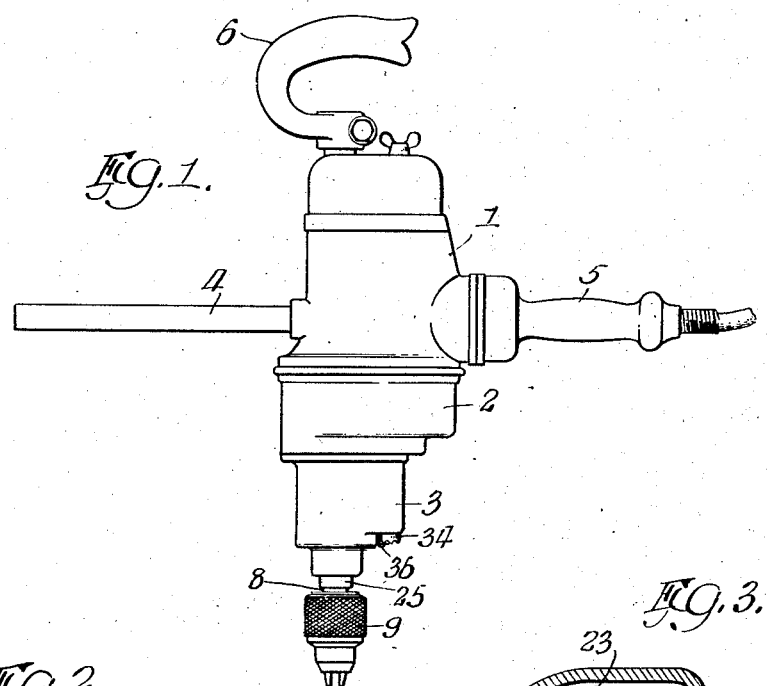
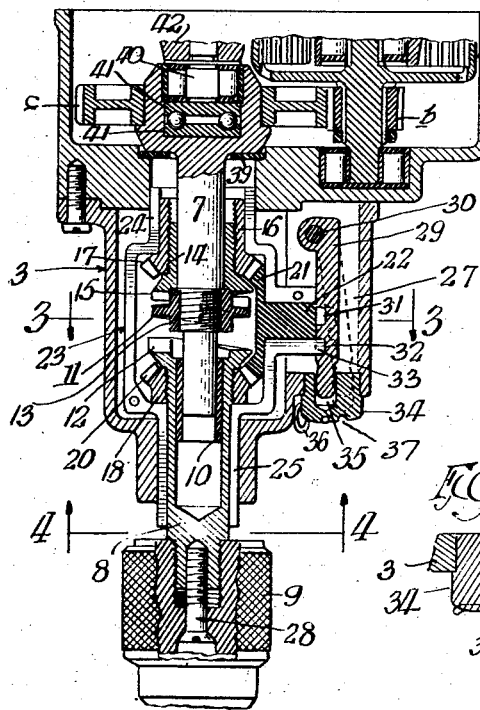
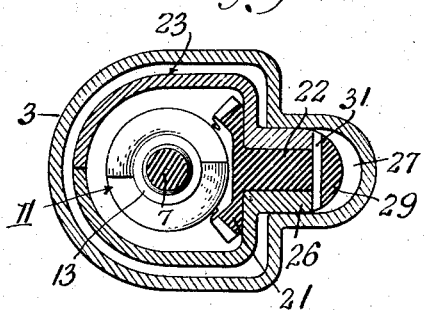
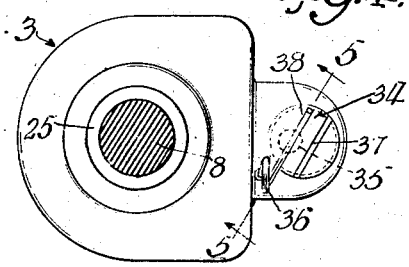
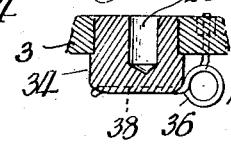
Inventor
Reinhold A. Norling
Atty.

Patented June 14, 1927.

1,632,671

UNITED STATES PATENT OFFICE.

REINHOLD A. NORLING, OF AURORA, ILLINOIS, ASSIGNOR TO INDEPENDENT PNEUMATIC TOOL COMPANY, OF CHICAGO, ILLINOIS, A CORPORATION OF DELAWARE.

REVERSING MECHANISM FOR ELECTRIC DRILLS.

Application filed September 2, 1922. Serial No. 585,854.

This invention relates to electric and other portable power driven drills.

One object of my invention is to provide a mechanism whereby the chuck spindle, this is, the spindle carrying the cutting or other working tool, may be reversed as often as desired without stopping the motor of the tool or changing its direction of rotation.

Another object of my invention is to accomplish this by the use of bevel gears and associated shiftable clutch members all contained within a case which is shifted endwise to change the rotation of the chuck spindle from forward to reverse and vice versa.

A further object of my invention is to provide means for locking the clutch means in either forward or reverse position and thus prevent accidental shifting of said mechanism while the tool proper is running when removed from the work or when pressed against the same.

The invention consists further in the particular form of structure designed for reversing the direction of rotation of the chuck spindle and the locking mechanism therefor.

In the accompanying drawings—

Fig. 1 is an elevational view of a portable electric drill equipped with a reversing mechanism of my invention;

Fig. 2 is an enlarged vertical sectional view taken through that part of the drill containing said mechanism and the chuck spindle.

Figs. 3 and 4 are horizontal sectional views taken on lines 3—3 and 4—4, respectively, of Fig. 2; and Fig. 5 is a vertical sectional view taken on line 5—5 of Fig. 4.

The drill shown in Fig. 1 has an outside casing divided into three connected sections, a main section 1, and intermediate and forward sections 2 and 3, respectively. The section 1 houses the electric motor of the tool and is equipped with side handles 4, 5 and a grip handle 6 at the rear end thereof. The drill or driving spindle 7 (Fig. 2) is journaled in the section 2 and the reducing gears $a$ $b$ and $c$ connecting the armature shaft of the motor with the spindle 7 are housed in said section 2. The section 3 houses the mechanism of my invention and this is between the drill spindle 7 and chuck or driven spindle 8 which is journaled in said section 3 and has at its outer end a tool holding chuck 9, as shown.

The chuck spindle 8 has a hollow upper end and into it extends the reduced lower end of the drill spindle 7, a bushing 10 being interposed between said parts, as shown in Fig. 2. Between these spindles 7 and 8 are opposed clutch members 11, 12, the former being fixed to the drill spindle 7, and the latter to the chuck spindle 8. The clutch member 11 has a nut 13 extending on opposite sides of it and connected by screw threads with the spindle 7. Loose on said spindle 7 above the nut 13 is a sleeve 14 having at its lower end a clutch member 15 above the clutch member 11, as illustrated in Fig. 2.

Threaded on the sleeve 14 is a sleeve 16 provided at its lower end with a bevel pinion 17. Threaded on the chuck spindle 8, below, but adjacent the clutch member 12 is a sleeve 18 provided at its upper end with a bevel pinion 20 of the same diameter as the one 17 above. Meshing with both pinions 17 and 20 is a bevel gear wheel 21 vertically arranged at one side of the spindles 7 and 8 and provided with a stub shaft 22 journaled in a case 23 contained within the outside section 3.

The case 23 has tubular end portions 24, 25 slidably retained in openings in the casing sections 2 and 3, respectively, as shown in Fig. 2, for guiding the case 23 when slid up and down or endwise with respect to the spindle 7. Said case 23 has a tubular part 26 extending from one side thereof and forming a bearing and support for the stub shaft 22 of the bevel gear 21. This part 26 takes into a vertical channel 27 in the section 3, as shown in Figs. 2 and 3. This construction holds the case 23 against rotation, yet allows it to be shifted endwise for reversing the chuck spindle 8.

By the gears in the section 2, the drill spindle 7 is rotated right handed. Said spindle 7 and clutch member 11 threaded thereon do not move endwise. Clutch member 11 has clutch teeth on both sides, facing clutch teeth on the clutch members 12 and 15, respectively. Positioned as in Fig. 2, the clutch spindle 8 would be run in a reverse direction to that of the spindle 7, because the clutches 11 and 15 are engaged. Power is transmitted at this time from drill spindle 7 to chuck spindle 8 through the engaged clutch members 11 and 15 and intermeshing bevel gears 17, 21 and 20. Bevel gear 17 turning right handed turns gear 21 left handed and the latter turns gear 20 in the same direction. Gear 20 is threaded on chuck spindle 8 with right hand threads and chuck 9 is turned reverse or left handed. As shown in Fig. 2, chuck 9 is threaded on spindle 8 by right hand threads but screw 28 threaded left handed prevents chuck 9 from coming off when running left or reverse.

To lock or hold parts on the positions described, so that the reversing mechanism will not be shifted when pressing the tool carried by the chuck 9 against the work, I provide in the channel 27 a locking bar 29 fulcrumed at its upper end on a cross pin 30 in the section 3. The bar 29 is vertically arranged and extends downward across and bears against the outer end of the tubular part 26 on the case 23, as shown in Fig. 2. Said bar 29 has two notches 31, 32 between its ends and both open toward the part 26. The latter has an outwardly projecting lug 33 to take in either of said notches 31, 32. In full lines in Fig. 2, the lug 33 is in the lower notch 32 and the case 23 is held against endwise movement in either direction. This locks the parts in reverse, and the drill proper will run in that direction until purposely changed.

To accomplish this, it is necessary to first swing the bar 29 outward into the dotted line position shown in Fig. 2, to release the lug 33 from the lower notch 32. By then pushing the chuck 9 inward, that is, toward the section 3, the chuck spindle 8 is moved inward, carrying with it the clutch member 12 into clutched engagement with the clutch member 11. At the same time, the pinion 20 is moved inward with the spindle 8 and acting on the gear 21 moves the case 23 in the same direction, due to the fact that said gear 21 is carried by said case. The gear 21 on being raised lifts the pinion 17, and the clutch member 15 being connected to it is raised out of clutched engagement with the clutch member 11 fixed to the drill spindle 7. On bringing the clutch member 21 into engagement with the one 11, the chuck 9 will be run forward, as there is then a direct connection between the spindles, the bevel gears not acting. To lock the parts in that position, the bar 29 is swung back into full line position and lug 33 is then in register with the upper notch 31 and enters the same to lock the case 23 against movement.

To reach the bar 29 from the outside and thus move it into and out of locking engagement with the lug 33, I provide a plug 34 rotatably mounted in the section 3 at the bottom of the channel 27. Said plug 34 has a recess 35 to receive and retain the lower end of the bar 29, as shown in Fig. 2. The recess 35 is drilled into the plug 34 eccentric to the outside diameter of the plug, so that by turning the plug, the lower end of the bar 29 will be shifted to swing the same. Turning the plug 34 half way around in one direction will swing the bar into position to engage the lug 33, while a like movement in the opposite direction will swing the bar out of engagement with said lug, as indicated by the full and dotted lines, respectively, in Fig. 2.

The plug 34 is held from dropping out of its opening by a bar spring 36. This has one end fastened to the section 3 but free to be swung sideways to clear the plug 34 when turning the latter. The plug 34 has outside slots or notches 37, 38, arranged parallel to receive the free end portion of the spring 36 to hold the plug from turning accidentally and preventing the spring from slipping off the plug. When the spring 36 is in slot 38, the bar 29 is held in either forward or reverse position, because the bar 29 is in the position in full lines in Fig. 2, whether the lug 33 is in notch 31 or 32. When the plug 34 is turned to hold the bar 29 out of locking engagement with the lug 33, the parts are as shown in dotted lines in Fig. 2, and the slot 37 is in position to receive the spring 36. When locked forward, the chuck spindle 8 runs in that direction, and its direction is not changed when forcing the tool against the work or when pulling it away, and the same is true when the mechanism is locked in reverse. When the bar 29 is held unlocked, then the chuck spindle 8 is free to run forward or reverse, as there is nothing to hold the case 3 against shifting.

To hold the drill spindle 7 from downward or outward movement, I provide a plate 39 under the enlarged upper end of the spindle, as shown in Fig. 2. A stud 40, and thrust plates 41, 41 of the antifriction bearing together with the fixed part 42 for the stud prevent the spindle from moving upward or inward.

The construction shown and described provides a mechanism for reversing the chuck spindle, as often as desired without stopping the motor of the tool or changing its direction of rotation. This is an advantage because starting and stopping of the motor to effect a reverse of the chuck spindle is avoided, and full application of power to the work is had as soon as the clutches are engaged, by having the motor running in one direction at all times. Moreover, the reversing mechanism being mechanical avoids the use of any electric structure to reverse the tool by changing the direction of rotation of the motor. The mechanism including the lock, holds the clutch members against accidental shifting and thus allows the tool proper to be run either forward or reverse as long as desired, with no fear of shifting the parts while the tool proper is held away from the work or when pressed against the same. By holding the locking bar 29 in unlocked position the drill may be run in one direction when pressed against the work and reverse when withdrawn therefrom, the reversing mechanism shifting as the force applied against the tool proper is changed.

The case 23 is divided vertically into two parts to facilitate making and assembling and in use said parts are held together when in the section 3.

While I have shown and described herein in detail a reversing mechanism embodying the features of my invention, it is of course to be understood that the details of construction shown and described may be variously changed and modified without departing from the spirit and scope of my invention.

I claim as my invention:

1. A portable electric drill, comprising an outside casing having a forward section, aligned drill and chuck spindles therewith the chuck spindle movable toward and from the drill spindle, a case slidably mounted in said forward section and movable with the chuck spindle, means including shiftable clutch members in said case and movable therewith for rotating the chuck spindle by the drill spindle either in the same direction as the latter or in a direction reverse thereto, and manually operable locking means in the forward section and engageable with said case for positively holding the said clutch members in either of their shifted positions.

2. In a portable power driven drill, the combination of aligned drill and chuck spindles, the latter being movable endwise toward and from the former, bevel gear pinions, one loose on the drill spindle and the other fixed on the chuck spindle, a bevel gear wheel meshing with both pinions for driving the chuck spindle by the drill spindle, a clutch member fixed on said drill spindle, movable clutch members on opposite sides of said fixed clutch and carried by said loose pinion and chuck spindle, respectively, said movable clutch members being moved into and out of clutched engagement with said fixed clutch member in the movement of said chuck spindle toward and from said drill spindle for changing the direction of rotation of said chuck spindle, and locking means manually operable from the outside of the drill for positively holding either of said movable clutch members in engagement with the fixed one.

3. In a portable power driven drill, the combination of aligned drill and chuck spindles, the latter being movable toward and from the former, a case surrounding said spindles and movable with the chuck spindle, meshing bevel gears in said case for driving one spindle by the other, clutch members in said case and associated with said gears and spindles for changing the direction of rotation of the chuck spindles, a pivoted bar with two notches, a lug carried by said case to engage in either of said notches for holding the clutch members in either of their shifted forward or reverse positions, and means for moving said bar into and out of locking engagement with said lug.

4. In a portable power driven drill having an outside casing, the combination of aligned drill and chuck spindles therein, the latter being movable endwise toward and from the latter, bevel gear pinions, one loose on said drill spindle and the other fixed on said chuck spindle, a bevel gear wheel in mesh with both pinions, a clutch member between said pinions and carried by said drill spindle to rotate therewith, movable clutch members on opposite sides of said fixed clutch member and carried by said loose pinion and chuck spindle, respectively, to rotate therewith, a case surrounding said spindles and movable with said chuck spindle, gears, and clutch members and supporting said gear wheel, said case being movable by said chuck spindle to move said movable clutch members alternately into and out of clutched engagement with said fixed clutch member for changing the direction of rotation of said chuck spindle, said outside casing having a channel to receive a lug on the case a pivoted bar in said channel and having two notches to receive said lug for holding the clutch members in either forward or reverse positions, and means carried by said case at the bottom of said channel and engaging said bar for swinging the same into and out of locking engagement with said lug.

5. In a portable power driven drill having an outside casing, the combination of drill and chuck spindles, means including shiftable clutch members for rotating the chuck spindle by the drill spindle and changing the direction of rotation of said chuck spindle, a pivoted locking bar in said outside casing for holding the clutch means in either forward or reverse positions, and a rotatable plug removably carried by said casing at the lower end of said bar and provided with a recess to receive the lower end of said bar, said recess being eccentrically arranged for moving said bar into and out of locking engagement with said clutch members.

6. In a portable power driven drill, the combination of on outside casing having a vertical channel at one side, aligned drill and chuck spindles in said casing, means including clutch members for driving the chuck spindle by the drill spindle and changing the direction of rotation of said chuck spindle, a case surrounding said means and having a projection in said channel, said projection having a lug, a locking bar pivoted in said channel and having two locking notches to receive said lug, one when the clutch means is in forward and the other when in reverse, a rotatable plug removably carried by said casing at the bottom of said channel, said plug having an eccentric recess to receive the lower end of said bar for moving the same in and out of locking engagement with said lug, and spring means for holding said plug in place, said case being slidable for shifting said clutches.

In testimony that I claim the foregoing as my invention, I affix my signature, this 28th day of August, A. D. 1922.

REINHOLD A. NORLING.